MAGNETIC AMPLIFIER CIRCUIT

Filed Dec. 29, 1955 2 Sheets-Sheet 1

MAGNETIC AMPLIFIER CIRCUIT

Filed Dec. 29, 1955 2 Sheets-Sheet 2

WITNESSES
Robert C. Baird
E. F. Oberheim

INVENTORS
Herbert Estrada, Jr., John P. Ward
and John G. Hammond.
BY
Paul E. Friedemann
ATTORNEY United States Patent Office 2,853,675
Patented Sept. 23, 1958

2,853,675

MAGNETIC AMPLIFIER CIRCUIT

Herbert Estrada, Jr., Idaho Falls, Idaho, John G. Hammond, Pacoima, Calif., and John P. Ward, Somerville, Mass., assignors to Westinghouse Electric Corporation, East Pittsburgh, Pa., a corporation of Pennsylvania Application December 29, 1955, Serial No. 556,144
9 Claims. (Cl. 323—89)

This invention relates generally to improvements in electric control circuit arrangements, and more particularly to provisions for stabilizing the operation of amplifiers embodied in such circuit arrangements.

Frequently amplifiers are employed to provide alternating-current power for control motor drives, for example, two-phase motor control systems. Both tube and magnetic types of amplifiers have been used in such arrangements with the magnetic amplifier being favored in applications requiring durability coupled with substantially maintenance-free amplifier operation. The control signals applied to amplifiers in such systems are frequently direct current, including an error signal from an error detecting means or other direct-current source.

In motor drives and, in general, in closed loop systems some form of negative feedback is usually necessary to stabilize the operation of the system. In applications wherein the amplifier supplies reversible-phase alternating current to the load, as in the case of the two-phase motor, the derivation of a direct-current feedback signal from the output of the amplifier to stabilize the amplifier requires circuitry capable of producing a reversible-polarity, direct-current voltage in response to reversals in phase of the alternating-current output. Additionally, sensitivity to the magnitude of the reversible-phase, alternating-current voltage at the output is required.

Accordingly, one object of this invention is to provide a closed loop alternating-current regulating or control system wherein provision is made for simply and effectively stabilizing system operation.

Further to the preceding object, it is an object hereof to provide a system of the class referred to embodying alternating-current output amplifier means having direct-current input circuits wherein provision is made for deriving a direct-current feedback voltage from said output.

More specifically stated, it is an object of this invention to stabilize the operation of a direct-current controlled amplifier means having a reversible-phase, variable-magnitude, alternating-current output, through the derivation of a reversible-polarity, direct-current feedback signal in response to the alternating-current output of the amplifier means.

The foregoing statements are merely illustrative of the various aims and objects of this invention. Other objects and advantages will become apparent from a study of the following specification when considered in conjunction with the accompanying drawings, in which.

Figure 1:
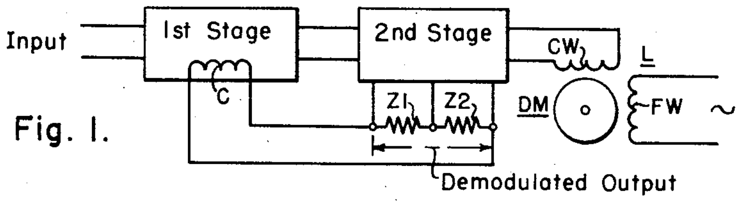
Figure 1 is a block diagram of a control system embodying the principles of this invention.

For the purposes of illustration only, and without any intention of limiting this invention to a particular type of control system, Fig. 1 depicts a two-phase motor system embodying the principles of this invention. In the arrangement illustrated, respective first and second stage amplifiers are arranged so that the output of the first stage controls the input to the second stage and the output of the second stage controls the control windings CW of a two-phase motor constituting an electrical load L with respect to the amplifier system. The two-phase motor is provided with an additional field winding, generally referred to as the fixed field and identified FW. As is well known, the speed and direction of rotation of this motor is dependent upon the magnitude of excitation of the winding CW and its instantaneous phase relation with respect to the winding FW. The system is controlled by an input circuit to the first-stage amplifier which may be any suitable circuit for achieving the type of control of the winding CW hereinbefore described. Details of typical types of amplifiers for use in the system herein disclosed are given in the other figures of the drawings.

The arrangement herein disclosed is provided with a demodulator circuit, generally designated DM and comprised of respective impedances Z1 and Z2, which, as will be described hereinafter, produces a demodulated output voltage derived from the output voltage of the second-stage amplifier, as illustrated, which is used as feedback to a control winding or control winding group of the first-stage amplifier, assuming that magnetic amplifiers are employed for the purpose of this discussion. This demodulated output voltage of direct-current characteristic varies in magnitude with the magnitude of the A. C. output voltage of the second-stage amplifier and reverses in polarity with reversals in phase of the output voltage of the second-stage amplifier.

The feedback of this demodulated output voltage to the first-stage amplifier, for application around the loop in controlling the output of the second-stage amplifier, is merely typical of one of several ways of effecting the feedback of this signal. If amplification is required prior to application to the second-stage amplifier, where the demodulated stabilizing signal is derived in a two-stage system, this represents a convenient way of effecting the feedback.

Figure 2:
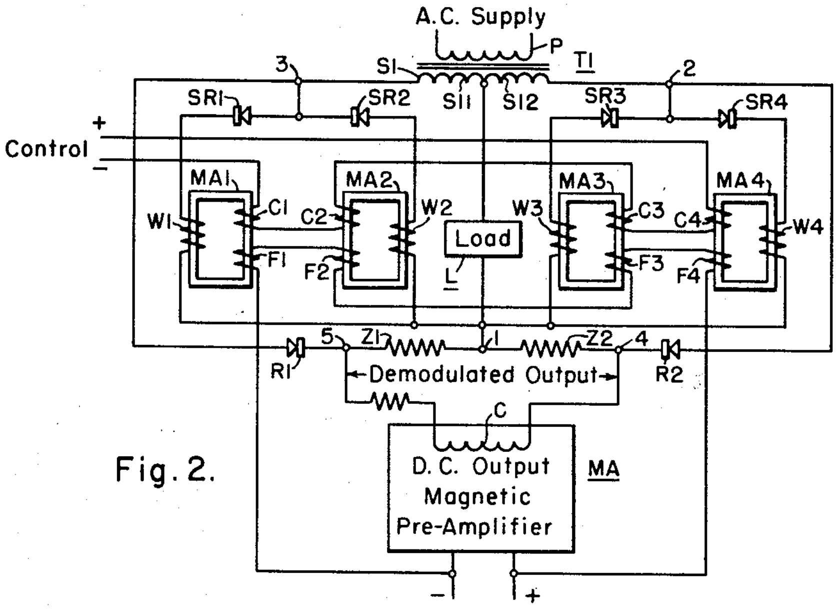
Fig. 2 is a diagrammatic illustration of a magnetic amplifier system embodying the principles of this invention.

Alternatively in such a system, rather than applying the demodulated stabilizing signal to a separate control circuit of the first-stage amplifier, this demodulated signal may be mixed in external circuitry with other input components to the amplifier and fed to a single control circuit for the first-stage amplifier. Further, as shown in Fig. 2, a separate amplifier may be employed, independent of the first stage or other amplifiers in the system, to amplify this demodulated signal prior to application in the second stage or input control circuits of the amplifier from which the demodulated signal is derived. Still further, in many applications, amplification of the demodulated output signal may not be necessary, in which case the demodulated output may be fed back directly to the control circuit or circuits of the amplifier from which the demodulated signal is derived. These and other equally obvious variations in the feedback arrangements will be readily apparent to those skilled in the art.

The details of this invention will be better appreciated from a consideration of a typical circuit arrangement such as illustrated in Fig. 2, which embodies a push-pull center-tap type of magnetic amplifier using pairs of parallel-connected, doubler-type magnetic amplifier groups for applying alternating-current output voltage to the load. Specifically, this circuit includes four magnetic amplifiers MA1, MA2, MA3 and MA4, respectively equipped with main windings W1, W2, W3 and W4. Each amplifier further includes a control winding, respectively designated C1, C2, C3 and C4, together with feedback windings, respectively designated F1, F2, F3 and F4. In the interest of simplicity, respective biasing windings for the magnetic amplifiers have not been shown. However, for the purpose of this discussion, it will be assumed that the amplifiers are biased for Class B operation, that is the respective amplifiers are biased essentially to their minimum output characteristic by suitable bias ampere turns, and are arranged for operation in the presence of the various control and feedback signals over the linear portion of their respective saturation characteristics.

As earlier noted, the amplifiers are arranged for push-pull operation. To this end, the amplifiers are connected in pairs with the main windings of the respective pairs arranged in oppositely-poled, parallel-circuit relation, the polarizing of these winding circuits being determined by the respective self-saturating rectifiers SR1, SR2, SR3 and SR4 which are connected in series in the respective main winding circuits. The first pair of amplifiers is comprised of amplifiers MA1 and MA2, and the second pair of amplifiers is comprised of amplifiers MA3 and MA4.

The alternating-current supply for the main winding circuits is provided by a transformer generally designated T1, which includes a primary winding P connected to a suitable alternating-current supply and a center-tapped secondary winding S1 having electrically equal winding sections S11 and S12. The respective pairs of magnetic amplifiers are connected in a series loop with the respective secondary winding sections, amplifiers MA1 and MA2 being connected in a series loop including secondary winding section S11 and the circuit branch including the load L which is connected to the center tap. Thus, the voltage of the secondary winding section S11 energizes the main winding circuits of magnetic amplifiers MA1 and MA2 and, in view of the opposite poling of the self-saturating rectifiers SR1 and SR2, this pair of magnetic amplifiers is arranged to selectively conduct on alternate half cycles of alternating-current voltage induced in the secondary winding section S11. Similar considerations apply to the second magnetic amplifier pair MA3 and MA4 connected in a series loop including secondary winding section S12 and the common branch including the load L.

Control voltage from the indicated control voltage source is applied to all of the control windings C1, C2, C3 and C4 which are connected in series with the control voltage source so that each winding carries the same current and hence, assuming each winding has the same number of effective turns, the control ampere turns acting on each magnetic amplifier will be the same. These windings are poled so that for one polarity of direct-current voltage, for example, that which is indicated in the drawing in Fig. 2, the amplifier pair MA1 and MA2 will be biased in a direction to drive the amplifier cores toward saturation in a degree depending upon the magnitude of the control ampere turns which, in turn, depends upon the magnitude of the control signal at the control source. However, the control windings C3 and C4 for this assumed condition drive the cores of the magnetic amplifiers MA3 and MA4 further away from saturation and, consequently, drive the amplifiers further into their minimum output range, preventing conduction thereof for the particular assumed condition. Therefore, the load will be controlled by conduction of amplifiers MA1 and MA2 with amplifiers MA3 and MA4 remaining inactive during the period in which control voltage is as indicated in the drawing. A reversal of the control voltage cuts off the amplifiers MA1 and MA2 and drives both of the amplifiers MA3 and MA4 toward saturation. These amplifiers now conduct in a degree determined by the magnitude of the control signal at the control source. However, in this instance, the phase of the alternating-current voltage applied to the load is reversed with respect to that applied thereto by the first pair of magnetic amplifiers MA1 and MA2. By this means, therefore, in addition to a control of the magnitude of the alternating-current voltage which is applied to the load, a reversal in phase of this output alternating-current voltage is also obtainable to effect a suitable control of the system such as, for example, the two-phase servo system illustrated in Fig. 1, to reverse the control motor.

The inherent modulating properties of magnetic amplifiers are ideally suited for providing high power level alternating-current outputs for control motor drives. However, in such arrangements, negative feedback is usually necessary to stabilize the operation of the system. This is especially true in closed loop systems. To stabilize the operation of the amplifier system, a demodulated output signal is needed in order to obtain a direct-current signal for comparison to the input, for example, the control voltage source indicated. In the arrangement herein illustrated, this comparison is effected magnetically in the magnetic circuits of the amplifier by applying the demodulated signal to windings which are separate from the control windings. However, as noted earlier, circuitry externally of the magnetic amplifiers may be employed to mix the control and feedback signals prior to application to a control winding or control windings of the magnetic amplifiers.

A demodulator employed for the purpose of producing such a feedback signal, in view of the reversible phase characteristic of the alternating-current output voltage, must be phase sensitive. A demodulator arrangement suitable for this application comprises respective polarized impedance circuits, respectively including polarizing rectifiers R1 and R2 and respective series-connected impedances Z1 and Z2. In Fig. 7 these polarized impedance circuits are respectively connected across that portion of the alternating-current circuits, shown in Fig. 2, including the secondary winding section S11 and load L in one case, and the secondary winding section S12 and the electrical load L in the second case. Due to the polarization of the respective impedance circuits, the voltage appearing across the respective impedances is a direct-current voltage derived from that half cycle of alternating-current voltage for which the respective rectifiers are poled. The impedance of the respective impedance circuits is such as to require minimum power for their operation, that is the production of voltages across the respective impedances draws negligible power from the respective amplifier circuits. This is a satisfactory arrangement because of the use of relatively high impedances in the respective demodulator circuit branches, since the primary uses for such a circuit for feedback and metering, and so forth, ordinarily involve high-impedance components.

Referring now to the first condition of conduction of the amplifiers discussed hereinabove, namely, that in which the amplifier pair MA1 and MA2 were conducting for at least a portion of alternate half cycles and the amplifiers MA3 and MA4 were biased to their minimum output, it will be seen that the second pair of amplifiers MA3 and MA4 present a relatively high impedance to the alternating-current signal appearing across the secondary winding section S12. Therefore, an alternating-current voltage substantially equal to the voltage across the secondary winding section S12 and the load voltage appears across the terminals 1 and 2. This voltage is half-wave rectified by the diode or rectifier R2. Meanwhile, amplifiers MA1 and MA2 are firing for at least part of each half cycle. During that portion of the half cycle for which rectifier R1 is poled to conduct, substantially no voltage appears across the terminals 3 and 1. The average voltage across impedance Z2 is then larger than the average voltage across the impedance Z1 by an amount proportional to the conducting time or magnitude, or both, of magnetic amplifier MA1, for example. The net voltage appearing across terminals 4 and 5 is then proportional to the alternating-current output of magnetic amplifier MA1.

With a reversal of the control voltage, amplifiers MA3 and MA4 conduct and amplifiers MA1 and MA2 are cut off or reduced to minimum output. This reverses the phase of the alternating-current voltage applied to the load. Under these conditions, the polarity of the voltage across terminals 4 and 5 reverses, since now the average voltage appearing across impedance Z2 is determined by conduction of magnetic amplifier MA4, and the voltage appearing across impedance Z1 is comprised of the voltage across secondary winding section S11 and the load L because the amplifier pair MA1 and MA2 is now non-conducting. Consequently, the average voltage across impedance Z1 is greater than the average voltage across impedance Z2 and, in view of the direct-current characteristic of this voltage, the polarity is reversed from that described in the first instance.

If the impedances of Z1 and Z2 are equal and much smaller than demodulator load C, while yet substantially greater than the minimum impedance in the conducting state of the associated magnetic amplifiers, essentially the entire output will appear across control winding C or other device and is available for any purpose.

In Fig. 2 this demodulated signal voltage is utilized as feedback for stabilizing the output of the magnetic amplifier system and, instead of being fed back to a preceding stage, such as the first stage in Fig. 1 in the servo system therein illustrated, is fed to a separate magnetic amplifier MA utilized herein to amplify the demodulated output signal to be fed back to the magnetic amplifier system. The direct-current output voltage derived from magnetic amplifier MA, the details of which amplifier may be conventional and are not illustrated in the interest of simplicity, is applied to the series-connected field winding system of the magnetic amplifiers comprising the field windings F1, F2, F3 and F4. This feedback voltage is applied in a negative sense, that is, the ampere turns produced by this feedback voltage in the magnetic amplifiers are such as to oppose saturation in the conducting pair. Conversely, in the non-conducting pair this feedback voltage tends to drive the amplifiers toward saturation. Conduction in the non-conducting pair may or may not be permitted depending upon system requirements. This is controlled by the relative magnitudes of the control signal ampere turns and bias ampere turns applied to the magnetic amplifiers.

Although the amplifiers have been described herein as being biased Class B, it will be appreciated by those skilled in the art that the amplifiers may be biased Class A or Class C.

Figure 3:
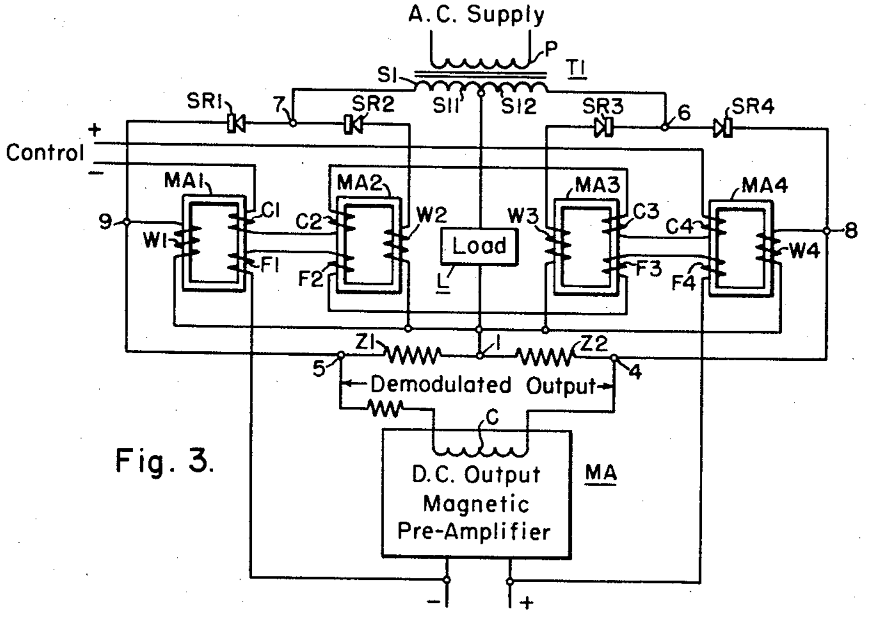
Figs. 3 and 4 are diagrammatic illustrations of modifications of the arrangement of Fig. 2.

In the modification of the invention illustrated in Fig. 3 the amplifier circuits and the method of feeding back the demodulated output signal are the same as those illustrated in Fig. 1. Accordingly, parts in Fig. 3 corresponding to those in Fig. 2 bear like reference characters and their function will be appreciated from the description made in connection with Fig. 2. The difference between the circuits of Figs. 2 and 3 resides in the manner in which the demodulator circuits are connected.

In this arrangement the alternating-current output of the magnetic amplifier system is picked off at points 6 and 7 through connections made at points 8 and 9, respectively between the self-saturating rectifier SR4 and main winding W4 in one case, and self-saturating rectifier SR1 and main winding W1 in the second case. With this arrangement the respective self-saturating rectifiers polarize the impedance circuits in opposition as before and, hence, there is no need for the rectifiers R1 and R2 utilized in Fig. 2 to polarize the impedance circuits. The modified circuit, however, is not quite as efficient as the circuit arrangement of Fig. 1, because the respective demodulator impedances Z1 and Z2 tend to load the respective rectifiers SR1 and SR4 which may alter somewhat the conduction characteristics of the magnetic amplifiers MA1 and MA4 with respect to the amplifiers with which they are paired. In applications which require only a moderate amount of feedback, or which allow lower circuit impedances, the modified circuit will prove advantageous by reducing the number of circuit components.

Figure 4:
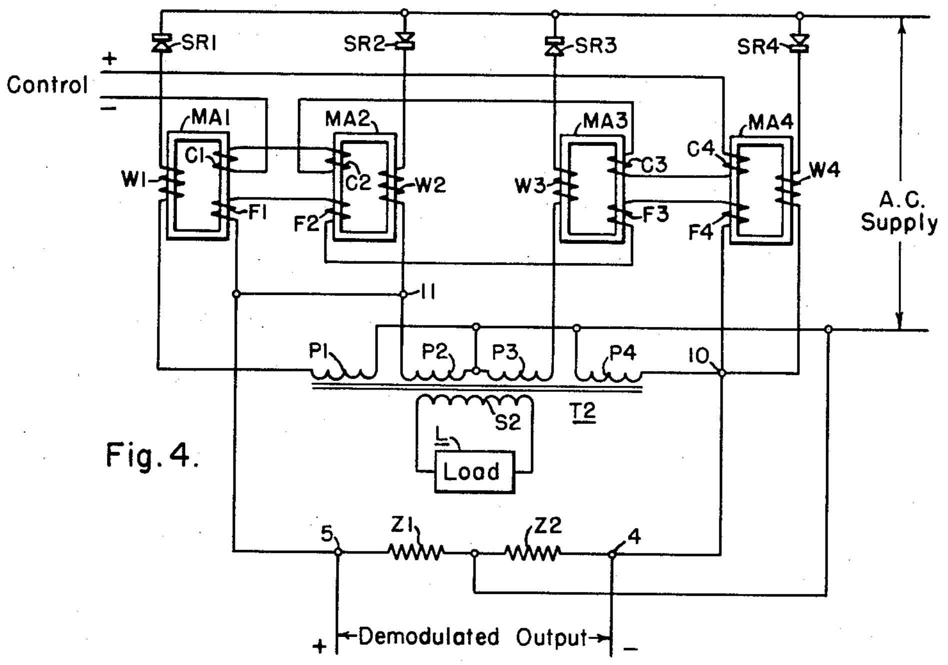

A further modification of this invention is illustrated in Fig. 4 which utilizes a four-core bridge-circuit arrangement. In this circuit the magnetic amplifiers MA1 and MA2 are connected in pairs and the magnetic amplifiers MA3 and MA4 are connected in pairs. The main winding circuits in each instance are connected in oppositely poled parallel-circuit relation across the indicated alternating-current supply and respectively include rectifier SR1, winding W1 and primary winding P1 of transformer T2; rectifier SR2, main winding W2 and primary winding P2; rectifier SR3, main winding W3 and primary winding P3; rectifier SR4, main winding W4 and primary winding P4. Phase reversal in this instance is achieved by suitable phasing of the primary windings P1 and P2 with respect to primary windings P3 and P4. For example, the phase relation with primary windings P1 and P3, which are connected to similarly poled main winding circuits of amplifiers MA1 and MA3, which are in different pairs, is such as to produce a phase reversal in the secondary winding S2 of the transformer T2 depending upon which is conducting. Similar considerations apply to primary windings P2 and P4, connected in main winding circuits of the magnetic amplifiers MA2 and MA4, so that phase reversal on the other half cycle of alternating current in the secondary winding S2 occurs depending upon which of the magnetic amplifiers is conducting. As in the case of Fig. 2, each magnetic amplifier is provided with a control winding, these being respectively designated C1, C2, C3 and C4. Similar considerations apply to the feedback windings F1, F2, F3 and F4. For the indicated polarity of control voltage applied to the control winding circuit, which again is a series circuit, amplifiers MA1 and MA2 are provided with control ampere turns tending to drive the cores toward saturation, while, on the other hand, the magnetic amplifiers MA3 and MA4 are provided with control ampere turns tending to drive these amplifier cores further away from saturation.

For the indicated condition of conduction of the magnetic amplifiers, current flow is established in primary windings P1 and P2 on alternate half cycles of the alternating-current supply voltage. Thus, alternating current of a particular phase is induced in the secondary winding S2 which energizes the load L connected thereto. Upon a reversal of the control voltage, magnetic amplifiers MA3 and MA4 become conducting and magnetic amplifiers MA1 and MA2 are cut off. Energization of the secondary winding S2 and the load is now due to excitation of primary windings P3 and P4 which, due to the phase relation described above, reverses the phase of the alternating-current voltage applied to the load.

In this circuit the demodulator voltage is picked off at terminals 10 and 11, respectively located between main winding W4 and primary winding P4 and main winding W2 and primary winding P2. Since the demodulator impedances Z1 and Z2 are connected in similarly poled main winding circuits operating at different current conduction levels, and since the connection afforded by the impedance circuits results in the opposition of the direct-current voltages across the impedance branches, it will be appreciated that a net voltage or a differential voltage will appear across the impedance terminals 4 and 5, as discussed in connection with Fig. 2, and, consequently, again a direct current voltage of magnitude and polarity corresponding to the magnitude and instant phase of the alternating-current output voltage of the magnetic amplifiers is obtained. This demodulated output voltage taken from terminals 4 and 5, in this instance, is applied directly to the series-connected feedback winding group to apply a negative feedback to the conducting pair of amplifiers, all as previously described. As in the case of Fig. 3, due to the polarizing effect of the respective self-saturating rectifiers SR2 and SR4, the need for separate polarizing rectifiers or diodes in series in the demodulator impedance circuits is unnecessary.

In keeping with the requirements of the patent statutes, several preferred embodiments of the invention have been herein illustrated and described. Further modifications of this invention, both in its details and in the organization of such details, will be apparent to those skilled in the art. Accordingly, it is intended that the foregoing disclosure and the showings made in the drawings are to be considered only as illustrative of the principles of this invention and are not to be construed in a limiting sense.

We claim as our invention:

1. A magnetic amplifier circuit comprising, four magnetic amplifiers having respective polarized main winding circuits and respective control winding circuits, alternating current circuit means for supplying alternating current, said main winding circuits being connected in oppositely poled pairs with said alternating current circuit means, an electrical load, circuit means connecting said electrical load with said pairs of main winding circuits to be energized with reversible phase alternating current depending upon which of said pairs of main winding circuits is conducting, means connected with said control circuit means for controlling said pairs of main winding circuits in opposite senses rendering one pair conductive and the other pair non-conductive selectively, and impedance circuits, rectifiers connected in electrical opposition with respect to each other in said impedance circuits, said impedance circuits being connected to be energized in dependence of conduction of at least one main winding circuit of the respective pairs.

2. Amplifier circuit means comprising, two pairs of direct current output amplifiers, the amplifiers of said respective pairs being connected in oppositely poled parallel circuit relation, an alternating current supply circuit having a pair of electrically equal voltage supply sections, first circuit means connecting one of said two pairs of direct current output amplifiers across one of said pairs of electrically equal voltage supply sections, second circuit means connecting the other of said two pairs of direct current output amplifiers across the other of said pair of electrically equal voltage supply sections, said first and second circuit means having a common branch portion, an electrical load connected in said common branch portion, control circuit means connected to control said respective pairs of amplifiers in opposite senses, and polarized impedance circuits connected in electrical opposition with each other and across said two pairs of parallel-connected amplifiers.

3. Amplifier circuit means comprising, two pairs of direct current output amplifiers, the amplifiers of said respective pairs being connected in oppositely poled parallel circuit relation, an alternating current supply circuit having a two-section impedance device with the sections connected together at a center tap for supplying a voltage, first circuit means connecting one of said two pairs of direct current output amplifiers across one of said impedance device sections, second circuit means connecting the other of said two pairs of direct current output amplifiers across the other section of said impedance device, said first and second circuit means having a common branch connected to the center tap of said impedance device, an electrical load connected in said common branch, control circuit means connected to control said respective pairs of amplifiers in opposite senses, and polarized impedance circuits connected in electrical opposition with respect to each other and connected across said two pairs of parallel-connected amplifiers.

4. Amplifier circuit means comprising, two pairs of direct current output amplifiers, the amplifiers of said respective pairs being connected in oppositely poled parallel circuit relation, an alternating current supply circuit having a two-section impedance device with the sections connected together at a center tap for supplying a voltage, first circuit means connecting one of said two pairs of direct current output amplifiers across one of said impedance device sections, second circuit means connecting the other of said two pairs of direct current output amplifiers across the other section of said impedance device, said first and second circuit means having a common branch connected to the center tap of said impedance device, an electrical load connected in said common branch, control circuit means connected to control said respective pairs of amplifiers in opposite senses, and first and second polarized impedance circuits, said first impedance circuit being connected across one of said two pairs of direct current output amplifiers, said second polarized impedance circuit being connected across the other of said two pairs of direct current output amplifiers and in electrical opposition with said first polarized impedance circuit.

5. Amplifier circuit means comprising, two pairs of direct current output amplifiers, the amplifiers of said respective pairs being connected in oppositely poled parallel circuit relation, an alternating current supply circuit having a two-section impedance device with the sections connected together at center tap for supplying a voltage, first circuit means connecting one of said two pairs of direct current output amplifiers across one of said impedance device sections, second circuit means connecting the other of said two pairs of direct current output amplifiers across the other section of said impedance device, said first and second circuit means having a common branch connected to the center tap of said impedance device, an electrical load connected in said common branch, control circuit means connected to control said two pairs of amplifiers in opposite senses, and first and second polarized impedance circuits, said first impedance circuit being connected across one of said two pairs of direct current output amplifiers, said second polarized impedance circuit being connected across the other of said two pairs of direct current output amplifiers and in electrical opposition with said first polarized impedance circuit, said first polarized impedance circuit being energized in dependence of the voltage appearing across said one section of said impedance device and said load, said second polarized impedance circuit being energized in dependence of the voltage appearing across said other section of said impedance device and said load.

6. Amplifier circuit means comprising, two pairs of amplifiers each having a unidirectional current conducting output circuit, control means for controlling the output of said two pairs of amplifiers, one of the output circuits of one of said two pairs of amplifiers being connected in opposite poled parallel circuit relation with the other output circuit of the other of said two pairs of amplifiers, an alternating voltage supply circuit having a pair of electrically equal voltage supply sections connected together at a common connection, first circuit means connecting one of said parallel output circuits across one of said equal voltage supply sections, second circuit means connecting the other of said parallel output circuits across the other of said equal voltage supply sections, said parallel output circuits having a common circuit portion connected to said common connection, an electrical load connected within said common circuit portion, first and second polarized impedance circuits for providing control feedback energy to said two pairs of amplifiers, said first polarized impedance circuit being connected in parallel with one of said two pairs of amplifiers, said second polarized impedance circuit connected in parallel with the other of said two pairs of amplifiers, said first and second polarized impedance circuits being connected in electrical opposition with respect to each other.

7. A magnetic amplifier circuit comprising, two pairs of magnetic amplifiers having polarized main winding circuits, control windings for said magnetic amplifiers, an alternating current supply transformer having a center tap secondary winding forming two electrically equal secondary winding sections, first circuit means connecting the main winding circuits of one of said two pairs of magnetic amplifiers across one of said secondary winding sections, second circuit means connecting the other of said two pairs of magnetic amplifiers across the other of said secondary winding sections, said first and second circuit means comprising a common circuit path connected to said center tap, an electrical load connected within said common circuit path, said main winding circuits within each of said two pairs of magnetic amplifiers being poled to conduct on alternate half cycles of said alternating current, a first polarized impedance circuit connected across one of said secondary winding sections, a second polarized impedance circuit connected across the other of said secondary winding sections, said first and second polarized impedance circuits being connected in electrical opposition with each other, and third circuit means responsive to said electrically opposed impedance circuits for controlling said control windings.

8. A magnetic amplifier circuit comprising, two pairs of magnetic amplifiers having polarized main winding circuits, control windings for said magnetic amplifiers, an alternating current supply transformer having a center tap secondary winding forming two electrically equal secondary winding sections, first circuit means connecting the main winding circuits of one of said two pairs of magnetic amplifiers across one of said secondary winding sections, second circuit means connecting the other of said two pairs of magnetic amplifiers across the other of said secondary winding sections, said first and second circuit means comprising a common circuit path connected to said center tap, an electrical load connected within said common circuit path, said main winding circuits within each of said two pairs of magnetic amplifiers being poled to conduct on alternate half cycles of said alternating current, a first polarized impedance circuit connected across one of said secondary winding sections, a second polarized impedance circuit connected across the other of said secondary winding sections, said first and second polarized impedance circuits being connected in electrical opposition with each other, and third circuit means responsive to said electrically opposed impedance circuits for controlling said control windings, said third circuit means comprising a magnetic amplifier for properly adjusting the level of control of said control windings.

9. A magnetic amplifier circuit comprising, two pairs of magnetic amplifiers having polarized main winding circuits, control windings for said magnetic amplifiers, an alternating current supply transformer having a center tap secondary winding forming two electrically equal secondary winding sections, first circuit means connecting the main winding circuits of one of said two pairs of magnetic amplifiers across one of said secondary winding sections, second circuit means connecting the main winding circuits of the other of said two pairs of magnetic amplifiers across the other of said secondary winding sections, said first and second circuit means comprising a common circuit path connected to said center tap, an electrical load connected within said common circuit path, said main winding circuits within each of said two pairs of magnetic amplifiers being poled to conduct on alternate half cycles of said alternating current, a first polarized impedance circuit connected across one of said secondary winding sections, a second polarized impedance circuit connected across the other of said secondary winding sections, said first and second polarized impedance circuits being connected in electrical opposition with each other, and third circuit means responsive to said electrically opposed impedance circuits for controlling said control windings, said main winding impedance circuits being variable between a non-conducting impedance value and a lower conducting impedance value, and the impedances of said polarized impedance circuits being between said main winding circuit impedance values.

References Cited in the file of this patent

UNITED STATES PATENTS

| | | |
|---|---|---|
| 2,509,864 | Hedstrom | May 30, 1950 |
| 2,733,307 | Ogle | Jan. 31, 1956 |

FOREIGN PATENTS

| | | |
|---|---|---|
| 598,285 | Great Britain | Feb. 13, 1948 |

OTHER REFERENCES

Publication entitled "Self-Balancing Magnetic Servo-Amplifiers," W. A. Geyger, published October 3, 1955.